United States Patent
Oh et al.

(10) Patent No.: US 8,402,475 B2
(45) Date of Patent: Mar. 19, 2013

(54) SCA-BASED SYSTEM AND METHOD OF CONNECTING COMPONENTS TO EACH OTHER

(75) Inventors: Sang Chul Oh, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 306 days.

(21) Appl. No.: 12/808,857

(22) PCT Filed: Sep. 11, 2008

(86) PCT No.: PCT/KR2008/005367
§ 371 (c)(1),
(2), (4) Date: Jun. 17, 2010

(87) PCT Pub. No.: WO2009/078549
PCT Pub. Date: Jun. 25, 2009

(65) Prior Publication Data
US 2010/0306785 A1    Dec. 2, 2010

(30) Foreign Application Priority Data
Dec. 17, 2007   (KR) .................. 10-2007-0132822

(51) Int. Cl.
*G06F 9/44* (2006.01)
(52) U.S. Cl. .................................................. 719/313
(58) Field of Classification Search .................. 719/310, 719/313
See application file for complete search history.

(56) References Cited

U.S. PATENT DOCUMENTS

| | | | |
|---|---|---|---|
| 6,966,050 B2 | 11/2005 | Watase et al. | |
| 7,773,575 B2* | 8/2010 | Rudnick | 370/347 |
| 7,809,410 B2* | 10/2010 | Palum et al. | 455/574 |
| 7,894,416 B2* | 2/2011 | Rudnick et al. | 370/347 |
| 8,213,409 B2* | 7/2012 | Rudnick et al. | 370/351 |
| 2007/0087735 A1* | 4/2007 | March et al. | 455/418 |
| 2007/0111718 A1* | 5/2007 | Palum et al. | 455/418 |

(Continued)

FOREIGN PATENT DOCUMENTS

| KR | 1020050051234 | 6/2005 |
|---|---|---|
| KR | 10-0554521 | 2/2006 |

(Continued)

OTHER PUBLICATIONS

Kim, Saehwa et al., "SCA-based Component Software Framework for SDR," IEEE Workshop on Software Technologies for Future Embedded Systems, pp. 3-6 (2003).

(Continued)

*Primary Examiner* — Van Nguyen
(74) *Attorney, Agent, or Firm* — Nelson Mullins Riley & Scarborough LLP; EuiHoon Lee, Esq.

(57) ABSTRACT

A software communication architecture (SCA)-based system includes a plurality of components and a relay component connected to the plurality of components. Since data among the components are transmitted through the relay component, it is possible to reduce the complexity of connection caused by an increase in the number of components and to prevent a file size from increasing. Therefore, it is possible to reduce the parsing time of a domain profile and to reduce mode exchange time so that it is possible to rapidly perform connection setups in an embedded environment and to effectively perform communication.

8 Claims, 4 Drawing Sheets

U.S. PATENT DOCUMENTS

2008/0109828 A1* 5/2008 Cho et al. .................. 719/320
2008/0198865 A1* 8/2008 Rudnick et al. ............. 370/406

FOREIGN PATENT DOCUMENTS

| KR | 10-0590730 | 6/2006 |
| KR | 1020070061167 | 6/2007 |
| KR | 1020080040104 | 5/2008 |

OTHER PUBLICATIONS

Kim, Saehwa et al., "Designing SCA-based Component Framework for Dynamic Deployment of SDR Components," pp. 241-253 (2005).
Kim, Saehwa et al., "SDR(Software Defined Radio)," pp. 161-172 (2006).

* cited by examiner

[Fig. 1]
Prior Art
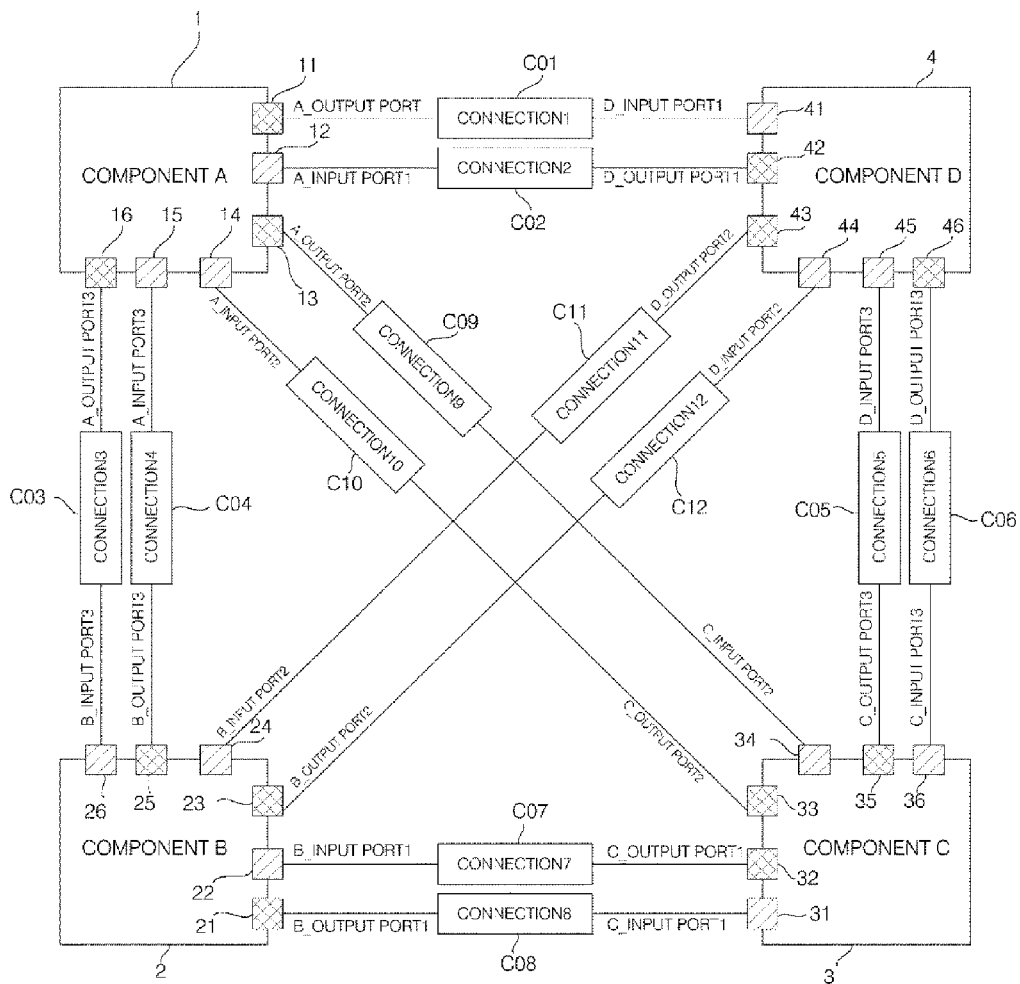

[Fig. 2]
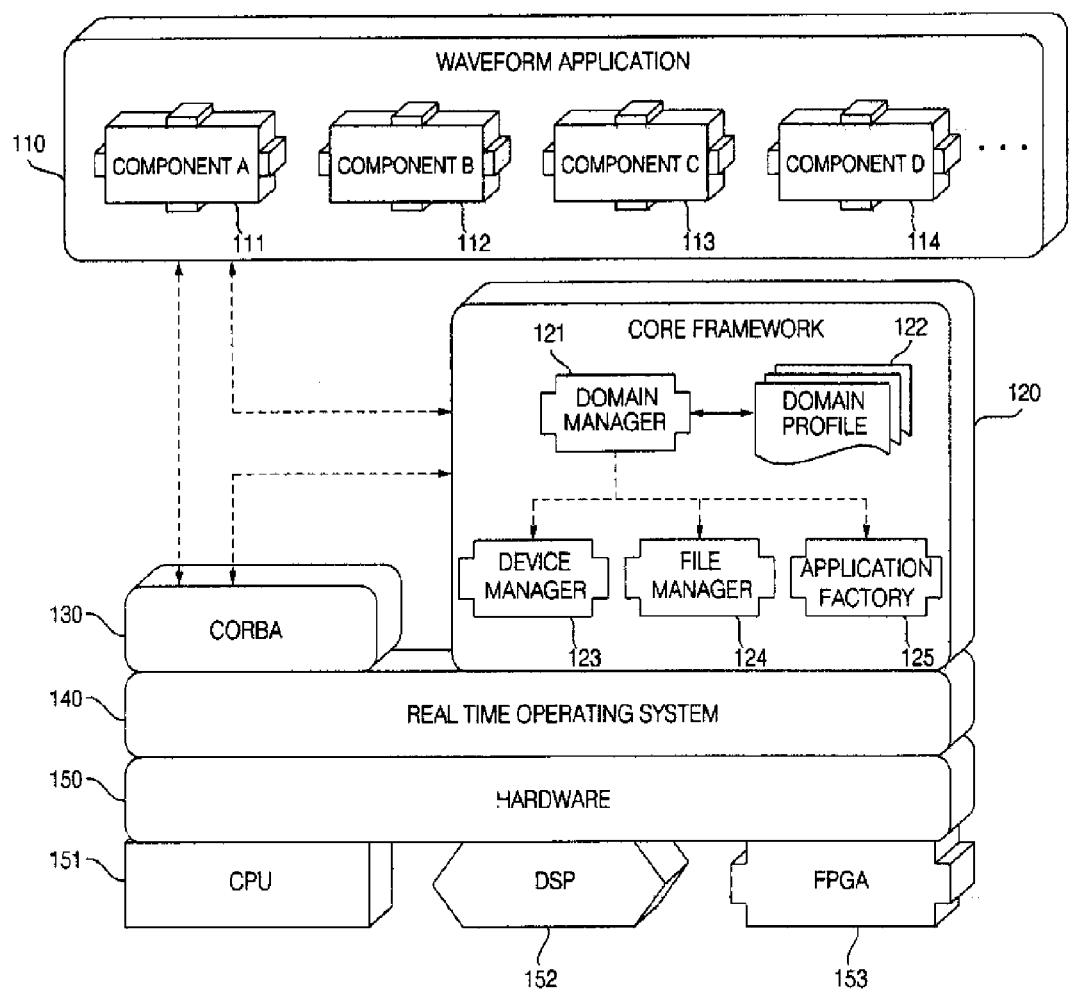

[Fig. 3]
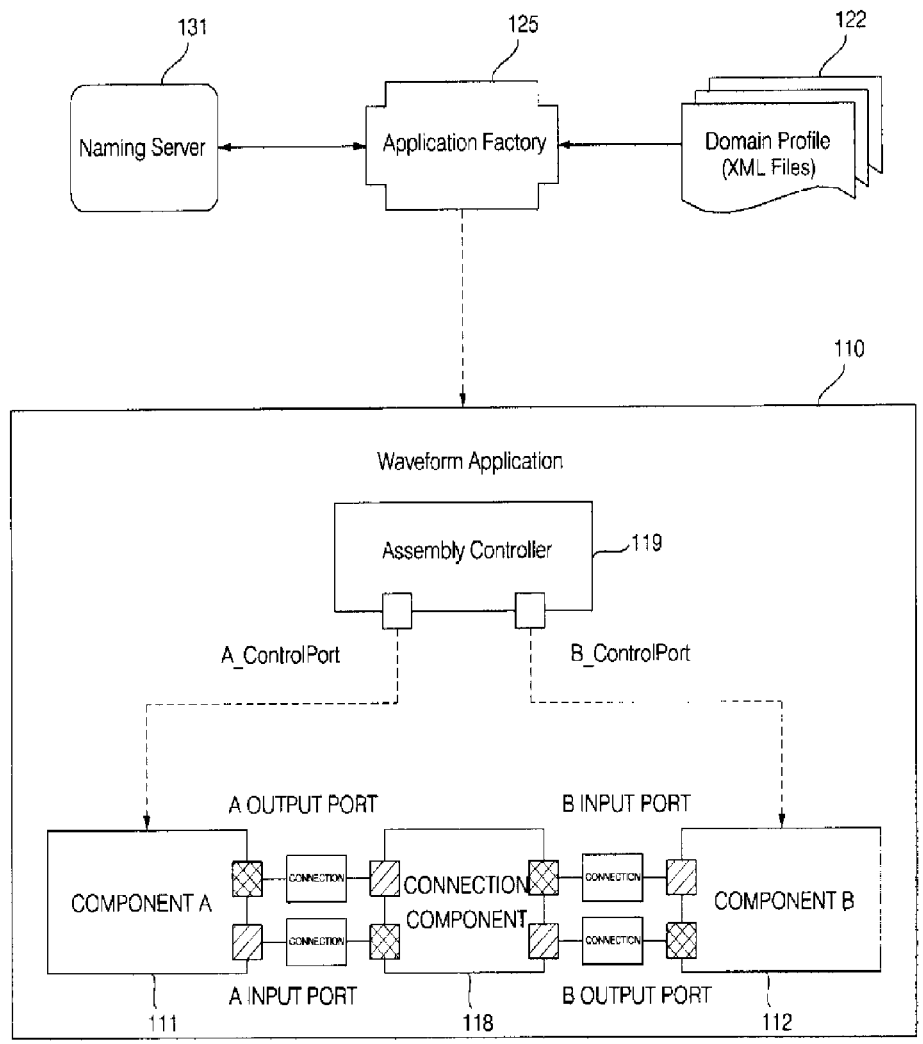

[Fig. 4]
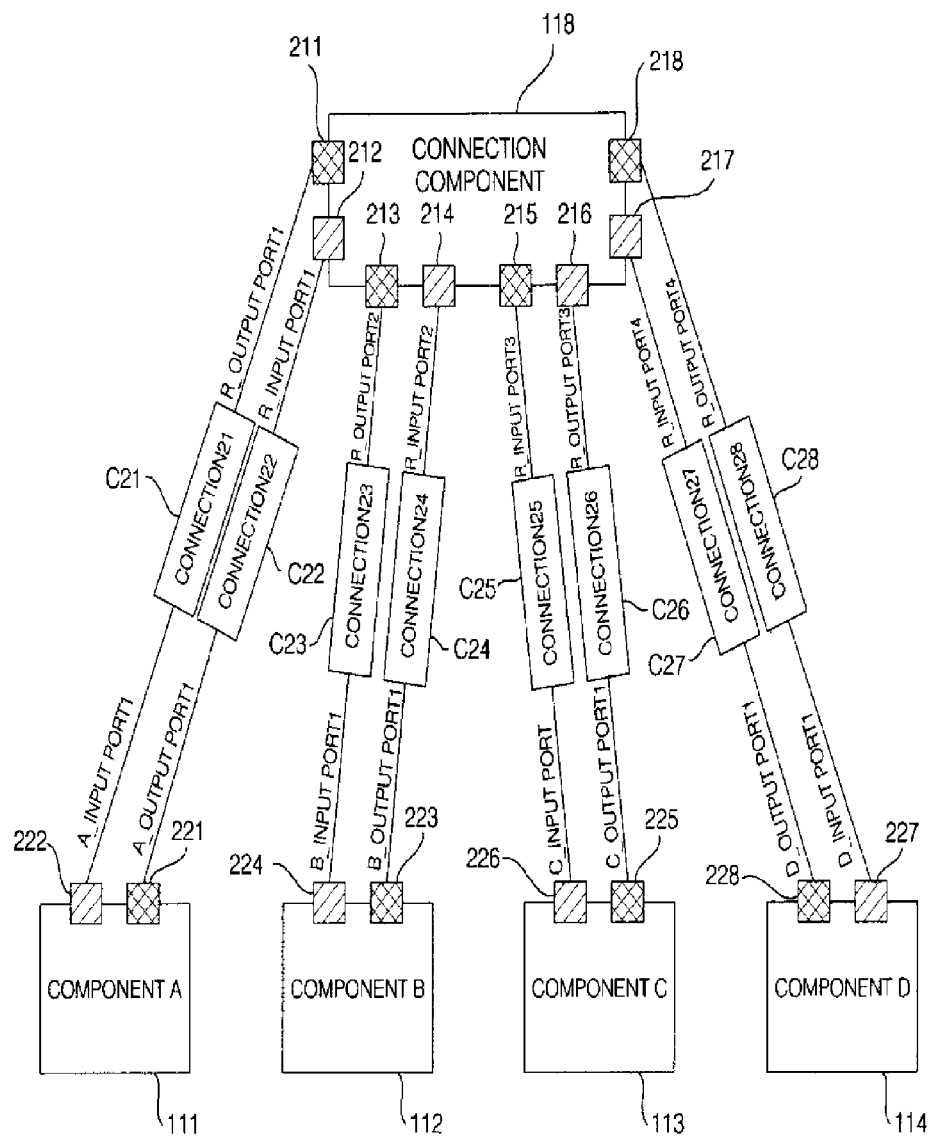

SCA-BASED SYSTEM AND METHOD OF CONNECTING COMPONENTS TO EACH OTHER

RELATED APPLICATIONS

This application is a 35 U.S.C. §371 national stage filing of PCT Application No. PCT/KR2008/005367 filed on Sep. 11, 2008, which claims priority to, and the benefit of, Korean Patent Application No. 10-2007-0132822 filed on Dec. 17, 2007. The contents of the aforementioned applications are hereby incorporated by reference.

TECHNICAL FIELD

The present invention relates to a software communication architecture (SCA)-based system capable of effectively connecting a plurality of components to each other with the complexity of connection setup reduced and a method of connecting the components to each other.

This work was supported by the IT R & D program of MIC/IITA [2006-S-012-02, 'Development of Middleware Platform for Software Defined Radio (SDR) Terminal'].

BACKGROUND ART

A software communication architecture (SCA) provided to remarkably improve mutual connection between communication systems and to reduce development and alignment cost adopts a real time operating system (OS) and a common object request broker architecture (CORBA) that is the industrial standard of a distributed object model as middleware to provide an environment for integrating different kinds of hardware and software, which is not limited to a specific system but is an independent system design framework.

The SCA-based system refers to a communication system based on the SCA. For example, the SDR system adopts the SCA as the standard of the software framework. In the SCA, an application performs the function of a waveform by binding a plurality of components to one package to provide and align the components.

In a conventional art, when one SCA based application is driven, the components that belong to the SCA based application transmit and receive data through a procedure of setting connection in an application factory in charge of the generation of the application using component connection data consisting of the components and a pair of input and output ports between the components that are described in a domain profile.

Connection information defined as connection between the input port and the output port must be defined and set among all of the components that require communication in one application. In particular, in the SCA, since the connection is defined as a single direction, connection information and port information between the components are defined in files to be managed.

Referring to FIG. 1, the SCA-based system includes a plurality of components in an SCA waveform application.

The components perform connection setups to communicate with each other. Therefore, each of the components includes input ports and output ports each having a number corresponding to the connection setups.

In order to have a component A 1 communicate with components B 2, C 3, and D 4, connection 1 and connection 2 (c01 and c02), connection 3 and connection 4 (c03 and c04), and connection 9 and connection 10 (c09 and c10) are defined for the components B 2, C 3, and D 4. At least three input ports and at least three output ports 11 to 16 corresponding to the connection setups.

In the case of the component B 2, the component C 3, and the component D 4, it is required to perform connection setups and to define ports. That is, in order to have the components communicate with each other, the connection setups in the form of a full mesh must be performed and the ports must be defined. In order to perform the connection setups among the components, each of the components must include at least three input ports and at least three output ports and 24 ports and total 12 connection setups must be defined among the components.

As the number of components increases, the number of required ports and connection setups rapidly increases. Load in a domain profile where the connection setups are defined increases so that time spent on file work also increases.

The above-described excessive increase in the number of connection setups and the number of ports increase the complexity of the domain profile, cause to increase the size of a file, and increase the load of a system in an embedded environment operated by small system resources to increase power consumption.

DISCLOSURE OF INVENTION

Technical Problem

In order to solve the above-described problems, it is an object of the present invention to provide a software communication architecture (SCA)-based system capable of improving an SCA-based application component communication structure to prevent the number of components and the number of ports from increasing, to prevent the complexity of a domain profile and the size of a file from excessively increasing, to perform effective communication among components through rapid connection setups, and to improve the performance of a system and a method of connecting components to each other.

Technical Solution

In order to achieve the object, a software communication architecture (SCA)-based system comprises a plurality of components for executing application, a domain profile for storing information on the plurality of components, an assembly controller for executing the plurality of components, and a relay component connected to the plurality of components to transmit control information on the assembly controller to the plurality of components and to transmit input data to a predetermined component in accordance with request of one of the plurality of components based on information on the domain profile.

A method of connecting components of an SCA-based system comprises a relay component performing connection setups for a plurality of components, receiving request of data transmission from one of the plurality of components in accordance with the connection setups, generating a routing table for transmitting units and receiving units of data in accordance with the request, and, when data are received, transmitting data to a component corresponding to the data based on the routing table.

Advantageous Effects

According to the present invention, in the SCA-based system and the method of connecting the components to each other, it is possible to prevent excessive connection and an increase in the number of ports in accordance with an increase in the number of components, to reduce the complexity of a domain profile and the size of a file, and to reduce the parsing time of the domain profile and mode exchange time so that it is possible to perform rapid connection setups, to perform effective communication, and to improve the performance of the system.

BRIEF DESCRIPTION OF THE DRAWINGS

FIG. 1 illustrates connection of components in a conventional art;

FIG. 2 illustrates a relationship between an SCA-based system structure and a waveform according to an embodiment of the present invention;

FIG. 3 is a block diagram illustrating connection of components in the waveform of the SCA-based system according to an embodiment of the present invention; and FIG. 4 illustrates the connection of the components using the relay components of the SCA-based system according to an embodiment of the present invention.

BEST MODE FOR CARRYING OUT THE INVENTION

Hereinafter, embodiments of the present invention will be described with reference to the accompanying drawings.

FIG. 2 illustrates a relationship between an SCA-based system structure and a waveform according to an embodiment of the present invention.

Referring to FIG. 2, an SCA-based system according to the present invention includes an application, an operating environment, and a hardware environment 150 and has the layer structure.

The hardware environment 150 includes a central processing unit (CPU) 151, a digital signal processor (DSP) 152, and a field programmable gate array (FPGA) 153.

The operating environment is provided on the hardware environment. The operating environment includes a real-time operating system (RTOS) 140, a core framework 120, a common object request broker architecture (CORBA) 130, and an interface.

In the application, a plurality of components 111 to 114 are provided in a waveform application 110 so that, when a predetermined application is performed, a corresponding component is operated so that mutual control information is transmitted and received through the connection setups among the components and that a predetermined work is performed.

The core framework 120 includes a domain profile 122, a domain manager 121, a device manager 123, a file manager 124, and an application factory 125. The core framework 120 provides the plurality of components 111 to 114 of the waveform application 110 in corresponding hardware. The plurality of components is executed by the domain manager 121, the device manager 123, the file manager 124, and the application factory 125.

At this time, the components 111 to 114 are connected to each other in accordance with the connection setup and the port information for mutual communication and information thereon is stored in the domain profile 122 in the form of an XML file. In addition, the domain profile 122 defines and stores driving information on all of the components.

Here, as an arbitrary application is provided in an assembly controller 119 to be executed, driving information is for selectively driving only the component required for executing the corresponding application.

FIG. 3 is a block diagram illustrating connection of components in the waveform of the SCA-based system according to an embodiment of the present invention.

Referring to FIG. 3, in the SCA-based system, all of the information on the waveform application 110, as described above, is stored in the domain profile 122 in the form of the XML file and, when the application is executed, connection is set for the corresponding component with reference to the domain profile and communication is performed so that the application performs a predetermined operation.

The application factory 125 analyzes the domain profile 122 to generate a waveform application X and to manage the assembly controller 119 and the corresponding component.

In addition, the names and control information of the assembly controller 119 and all of the components 111 to 114 are registered in a naming server 131 of the CORBA 130 and all of the components 111 to 114 investigate the registration information to search information on the other components and to perform communication through mutual connection. At this time, all of the components are driven by the assembly controller 119.

The assembly controller 119 controls the driving all of the components in the SCA-based system, that is, the components A to D 111 to 114. The assembly controller 119 controls the driving of the components to be started or stopped and, when an arbitrary application is provided and driven, registers the name thereof and the name of the corresponding application in the naming server 131.

The assembly controller 119 interprets the XML file stored in the domain profile 122 to selectively drive the component required for executing the corresponding application among all of the components. When component exchange request is received, the assembly controller 119 transmits a component exchange request signal to the component to be exchanged and deletes the corresponding component. In addition, the assembly controller 119 that received the generation of abnormal operation stop from an arbitrary component deletes the corresponding component.

The naming server 131 in which an arbitrary application is provided and driven receives a registration request signal from the assembly controller 119 and the components to register the assembly controller 119, the application, the components, and the names of the data input ports of the components in a naming tree.

When inquiry information on the destination of output data including the name of another component to which data are to be transmitted is received from an arbitrary component, the naming server 131 transmits information on the data input port of the corresponding component registered in the naming tree.

On the other hand, when the abnormal operation stop is generated or a registration canceling request signal is received from the component that received the component exchange request, the naming server 110 cancels the registration of the name of the corresponding component and the name of the data input port.

At this time, the waveform application 110 includes a relay component 118 connected to the plurality of components.

When connection setup from one component to another component is requested, the relay component 118 has both components connected to each other in accordance with registration information on the components registered in the naming server 131 and connection setup information on the domain profile 122.

At this time, the connection component 118 is connected to all of the components 111 to 114 and to the assembly controller 119 so that a predetermined control signal is transmitted.

All of the components 111 to 114 including the relay component 118 and the assembly controller 119 include input ports and output ports to transmit control information through the input ports and to receive the control information through the output ports. At this time, the input ports and the output ports are connected to each other one to one in a single direction. Here, the input ports and the output ports of the components are not registered in the naming server 131 and are operated in the components.

At this time, all of the components monitor data received to the input ports for the provided input ports and output ports and, when data that are not the data to be received are input, do not receive the data to prevent the generation of errors. On the other hand, the components that sensed the abnormal operation stop or that received the component exchange request from the assembly controller 119 request the component information registered in the naming server 131 to be registration canceled.

FIG. 4 illustrates the connection of the components using the relay components of the SCA-based system according to an embodiment of the present invention.

Referring to FIG. 4, the relay component 118 is connected to components, that is, a component A 111, a component B 112, a component C 113, and a component D 114.

At this time, the relay component 118 includes four input ports 212, 214, 216, and 218 and four output ports 211, 213, 215, and 217 to be connected to the components through the input ports and the output ports and transmit and receive data including control information through connection setups, that is, first to eighth connections C21 to C28.

An input port and an output port are provided in each of the components 111 to 114. Therefore, total 12 input and output ports 211 to 218 and 222 to 228 are provided and eight connection setups C21 to C28 are performed in the four components 111 to 114 and the relay component 118.

The components request to set the destination list for the data to be transmitted to the relay component 118 before transmitting data. At this time, the destination can be the plurality of components. In this case, the effect of multicast is shown.

The relay component 118 creates a routing table such as Table 1 based on the requests of the components to rout data based on the routing table.

For example, when data transmission from the component C 113 to the component D 114 is requested, a routing table is created so that the data of R_input port 3 215 connected to the C output port 1 226 of the component C 113 are transmitted to the R_output port 4 218 connected to the component D 114.

TABLE 1

| Transmitting unit | Destination 1 | Destination 2 | Destination 3 | Destination 4 |
|---|---|---|---|---|
| R_input port 1 | R_output port 2 | R_output port 3 | R_output port 4 | NULL |
| R_input port 2 | R_output port 3 | NULL | NULL | NULL |
| R_input port 3 | R_output port 4 | NULL | NULL | NULL |
| R_input port 4 | R_output port 2 | R_output port 3 | NULL | NULL |

As illustrated in Table 1, the relay component 118 transmits data received through the R_input port 1 212 to the R_output port 2 213, the R_output port 3 215, and the R_output port 4 217 in accordance with information on the destinations 1, 2, and 3. At this time, since one input is transmitted to a plurality of output ports, the multicast effect is shown. At this time, since the R_input port 1 212 is connected to the A output port 1 221 that is the output port of the component A through the connection 21 C21, input data are transmitted from the component A 111 and the data are transmitted to the components B, C, and D 112, 113, and 114.

At this time, data transmitted to the R_output port 2 213 are transmitted to the B_input port 1 224 of the component B 112 through the connection 23 C23 to be input to the component B 112. Data transmitted to the R_output port 3 215 are transmitted to the C_input port 226 of the component C 113 through the connection 25 C25 and data transmitted to the R_output port 3 215 are transmitted to the D_input port 1 228 of the component D 114 through the connection 27 C27.

That is, data transmitted from the component A 111 are transmitted to the components B, C, and D 112, 113, and 114 through the relay component 118.

In addition, the connection component 118 transmit data input from the R_input port 2 214 through the R_output port 3 215 so that the data of the component B 112 are transmitted to the component C 113.

The relay component creates the routing table such as Table 1 to control input and output data so that data are transmitted to and received from the components. As a result, the component A 111 multicasts data to the components B, C, and D 112, 113, and 114 through the relay component 118. The component B 112 transmits data to the component C 113, the component C 113 transmits data to the component D 114, and the component D 114 multicasts data to the components B and C 112 and 113.

Therefore, in the SCA-based system and the method of connecting the components to each other, since the components are connected to each other using the relay component, although the number of components increases, the number of connection setups or the number of ports do not excessively increase so that the complexity of the domain profile is reduced and that the file size is reduced to reduce load caused by the connection setups of the components and to improve performance.

As described above, the SCA-based system according to the present invention and the method of connecting the components to each other have been described with reference to the embodiment shown in the drawings, these are merely illustrative, and those skilled in the art will understand that various modifications and equivalent other embodiments of the present invention are possible. Consequently, the true technical protective scope of the present invention must be determined based on the technical spirit of the appended claims.

INDUSTRIAL APPLICABILITY

According to the present invention, in the SCA-based system and the method of connecting the components to each other, since the components are connected to each other and data are transmitted using the relay component, it is possible to prevent the connection setups and the number of ports from excessively increasing due to the increase in the number of components. Therefore, it is possible to reduce the complexity of the domain profile and the file size so that it is possible to rapidly perform connection setups, to effectively perform communication, and to improve the performance of the system.

The invention claimed is:

1. A system based on software communication architecture (SCA), comprising a processor configured to execute:
   a plurality of components for executing application;
   a domain profile for storing information on the plurality of components;
   an assembly controller for executing the plurality of components; and
   a relay component connected to the plurality of components to transmit control information on the assembly controller to the plurality of components and to transmit input data to a predetermined component in accordance with request of one of the plurality of components based on information on the domain profile,
   wherein the plurality of components comprise an input port and an output port connected to the relay component,
   wherein the relay component comprises a plurality of input ports and a plurality of output ports connected to the plurality of components, and
   wherein the input ports and the output ports of the relay component are connected to each other one to one in a single direction.

2. The system of claim 1, wherein, when a destination list for transmitted data is requested by one of the plurality of components, the relay component generates a routing table to transmit data in accordance with information on a component to which the data are to be transmitted.

3. The system of claim 2, the relay component generates the routing table so that the data are transmitted to a plurality of components to correspond to the destination list request.

4. The system of claim 2, wherein the relay component sets an input port connected to a component to which data are to be transmitted as a transmitting unit of data and generates the routing table using output ports connected to components in accordance with the destination list as destination information.

5. A method of connecting components of an SCA-based system, comprising:
   a relay component performing connection setups for a plurality of components;
   receiving request of data transmission from one of the plurality of components in accordance with the connection setups;
   generating a routing table for transmitting units and receiving units of data in accordance with the request; and
   when data are received, transmitting data to a component corresponding to the data based on the routing table,
   wherein the plurality of components comprise an input port and an output port connected to the relay component,
   wherein the relay component comprises a plurality of input ports and a plurality of output ports connected to the plurality of components, and
   wherein the input ports and the output ports of the relay component are connected to each other one to one in a single direction.

6. The method of claim 5, wherein generating the routing table further comprises setting an input port of the relay component connected to a component that requested data to be transmitted as a transmitting unit and setting an output port connected to a component that will receive data as destination information.

7. The method of claim 5, wherein performing the connection setups further comprises one to one connecting one of a plurality of input ports included in the relay component to one output port of the plurality of components and one to one connecting one of a plurality of output ports included in the relay component to one input port of one of the plurality of components.

8. The method of claim 7, wherein performing the connection setups further comprises storing information on components connected to a plurality of input ports and output ports of the connection components in a domain profile.

* * * * *